March 6, 1962     A. COX ETAL     3,023,673
VARIABLE MAGNIFICATION AFOCAL LENS MEMBER
Filed Dec. 12, 1958
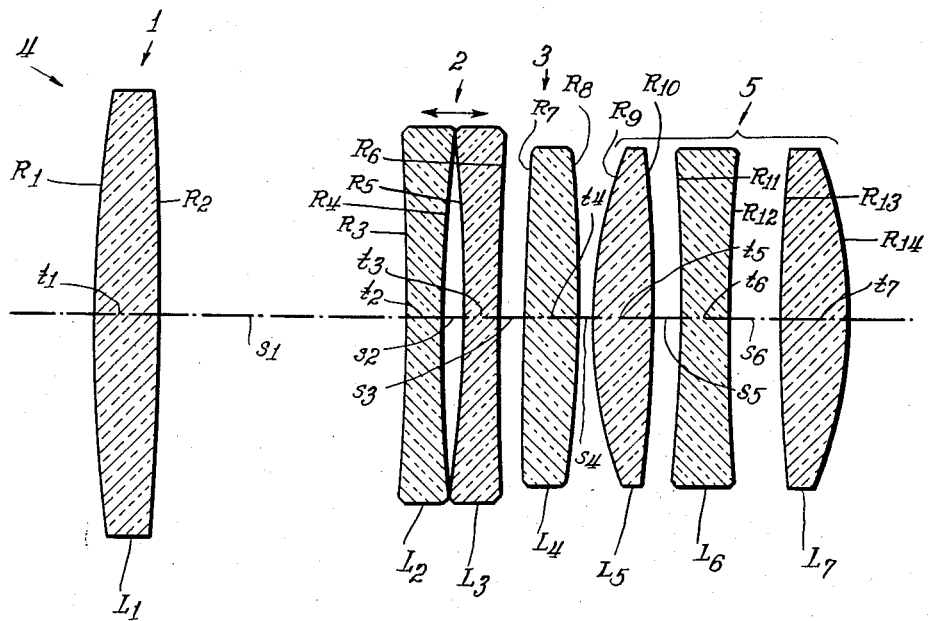
INVENTOR.
Arthur Cox and
Walter R. Linke
By Robert F. Miehle, Att'y.

United States Patent Office 3,023,673
Patented Mar. 6, 1962

3,023,673
VARIABLE MAGNIFICATION AFOCAL
LENS MEMBER
Arthur Cox, Park Ridge, and Walter R. Linke, Chicago, Ill., assignors to Bell & Howell Company, Chicago, Ill., a corporation of Illinois
Filed Dec. 12, 1958, Ser. No. 780,100
2 Claims. (Cl. 88—57)

This invention relates to a lens system, and more particularly to a variable magnification zoom lens attachment for a projector lens system.

An object of the invention is the provision of a zoom lens system in which a single component may be adjusted to change the magnification of the system without appreciably changing the focus thereof.

Another object of the invention is to provide a zoom lens attachment for the primary lens of a projector and operating to change the magnification of the resulting lens system without appraciable change in back focal length thereof with the sole necessary adjustment of the system being that of one of the components of the attachment.

A further object of the invention is to provide a variable magnification lens attachment for the primary objective of a projector and in which the attachment consists of a positive front singlet, a positive rear singlet equal in power to the front singlet and a negative doublet having identical lenses each of a power ten percent greater than that of each positive singlet. The negative doublet is positioned substantially midway between the positive components and may be adjusted along the axis to vary the magnification of the system without varying the focus of the system to the extent requiring adjustment of the primary lens objective.

It is to be understood that the terms "front" and "rear" refer to the ends of the objective respectively nearer the longer and shorter conjugates thereof.

In the drawing, there is shown a zoom lens attachment 4 for a known lens objective 5 of a motion picture projector. The objective 5 is of the adjustable focus type so that the combined lens system of the attachment 4 and the objective 5 can be brought into focus relative to the film plane or field, and then the magnification of the system may be varied rapidly by the simple step of adjusting a negative doublet component 2 of the attachment relative to front and rear identical oppositely facing positive components 1 and 3 composed of lenses $L_1$ and $L_4$, respectively. The negative doublet component 2 is shown as being of the edge contact or air spaced type adjustable along the axis of the attachment and comprises identical and opposite facing lenses $L_2$ and $L_3$ of equal negative power. The component 2 also may be a compound biconcave doublet or a biconcave singlet. Each of the lenses $L_2$ and $L_3$ is of a numerical power ten percent greater than that of each of the lenses $L_1$ and $L_4$. The lenses $L_1$ to $L_4$ have respective spherical optical surfaces $R_1$ to $R_8$, axial thicknesses of $t_1$ to $t_4$ and axial separations $s_1$ to $s_3$. In the construction of the attachment, $R_3 = R_6$ and $R_4 = R_5$. $L_4$ is a positive member, equal in power to $L_1$, with $R_7 = R_2$ and $R_8 = R_1$. Then, when $s_1 = s_3$, the system is essentially a symmetrical pair of doublets, of total power zero, and with unit magnification.

This system possesses the novel property of changing magnification as $L_2$ and $L_3$ are shifted as a unit, the sum of $s_1$ and $s_3$ remaining constant. Specifically, when $s_1 > s_3$, $m > 1.0$ and when $s_1 < s_3$, $m < 1.0$. Although the magnification of the entire system changes as indicated, the overall power of the attachment remains substantially at zero. Thus, when the attachment 4 is used in conjunction with a standard projection lens, manual adjustment of the lenses $L_2$ and $L_3$ by well known means (not shown) accomplishes a change in the effective focal length of the system, without any appreciable change of the back focus of the system.

Each of the lenses $L_1$ to $L_4$ is of common crown glass of $n_d$ 1.523, and of such powers that:

$$f_1 = f_4 = -1.10 f_2$$
$$f_2 = f_3$$

where $f_1$ to $f_4$ are the respective focal lengths of the lenses $L_1$ to $L_4$.

The Petzval sum of the attachment is reduced to negligible proportions, and the lateral color is so balanced as to be near zero at the mid range position of the doublet 2, and of equal magnitude but opposite sign at opposite extremes.

Spherical aberration is kept to a minimum by maintaining the following ratios:

$$.30 R_1 < f_1 < .5 R_1$$

$$1.10 < \frac{R_2}{R_3} < 1.20$$

Coma and astigmatism are made to vary by a minimum about zero as an approximate average by the construction of the attachment in which $$2.15 < \frac{-R_3}{R_4} < 2.25$$

and $$f_1 = -1.10 f_2$$

and $$0.1 < \frac{s_1}{s_3} < 10.0 \text{ to } 0.1 > \frac{s_1}{s_3} > 10.0$$

The system then has a magnification range of from .893 to 1.125, or a total ratio of 1.26 to 1.

A preferred embodiment of the invention of attachment designed for use with projection lenses of from 2 inches to 4 inches focal lengths is constructed substantially in accordance with the following table, in which dimensions are given in inches and $n_d$ designates the indices of refraction at the sodium D line and V designates the Abbé dispersion factors, and in which the signs of the surfaces taken from the point of view of the left hand or front end of the attachment:

| | | | | |
|---|---|---|---|---|
| $L_1$ | $R_1 = +5.708$ | $t_1 = .260$ | $n_d = 1.523$ | $V = 58.6$ |
| | $R_2 = -13.780$ | $s_1 = .100$ to .900 | | |
| $L_2$ | $R_3 = -11.761$ | $t_2 = .140$ | $n_d = 1.523$ | $V = 58.6$ |
| | $R_4 = +5.364$ | $s_2 = .146$ | | |
| $L_3$ | $R_5 = -5.364$ | $t_3 = .140$ | $n_d = 1.523$ | $V = 58.6$ |
| | $R_6 = +11.761$ | $s_3 = .900$ to .100 | | |
| $L_4$ | $R_7 = +13.780$ | $t_4 = .210$ | $n_d = 1.523$ | $V = 58.6$ |
| | $R_8 = -5.708$ | | | |

In the lens system of the combined attachment 4 and primary objective 5, zooming action is obtained by merely varying the position of the negative doublet which does not sensibly change the back focus of the system while appreciably varying the magnification of the system. The attachment is very simple and inexpensive in construction while being substantially symmetrical and hence not introducing error into the system.

While the invention is thus described, it is not wished to be limited to the precise details described, as changes may be readily made without departing from the spirit of the invention.

What is claimed is:
1. A variable magnification afocal front lens member for a projection lens comprising a front positive com- ponent of a predetermined power, a pair of intermediate negative components each of a negative power greater numerically than the power of the front component and each being of substantially the same power, and a rear positive component of a power equal to that of the front positive component, the negative components facing oppositely to one another and the positive components facing oppositely to one another, the negative components being spaced closely to one another and being adjustable relative to and spaced substantially midway between the positive components, the negative components being movable relative to the positive components through a magnification range of at least about 1.26 to 1, each of the components being composed of crown glass of refractive index of 1.523 on the sodium D line, the objective being substantially in conformance with the following inequalities:

$$.30R_1 < f_1 < .5R_1$$

$$-1.10 < \frac{R_2}{-R_3} < 1.20$$

$$2.15 < \frac{R_3}{R_4} < 2.25 \text{ for } f_1 = 1.10 f_2$$

and $$0.1 < \frac{s_1}{s_3} < 10$$

in which $f_1$ is the focal length of the front component, $f_2$ is the focal length of the front intermediate component, $s_1$ and $s_3$ are the axial separations respectively between the front component and intermediate components and the rear component and intermediate components, $R_1$ is the front optical surface of and $R_2$ is the rear optical surface of the front component and $R_3$ is the front optical surface of the front negative component and $R_4$ is the rear optical surface of the front negative component.

2. A lens attachment for a projection lens comprising front and rear positive components of substantially equal predetermined power, and a pair of intermediate negative components of substantially equal power, and further characterized in that said objective complies substantially with the following table in which the dimensions are in terms of inches and beginning with the front end of the attachment $L_1$ to $L_4$ designate the components, $R_1$ to $R_8$ the radii of curvature of the surfaces, $t_1$ to $t_4$ the axial thicknesses, $s_1$ to $s_3$ the axial separations, $n_d$ the refractive indices for the D line and V the Abbé dispersion numbers:

| | | | | |
|---|---|---|---|---|
| $L_1$ | $R_1=+5.708$ | $t_1=.260$ | $n_d=1.523$ | $V=58.6$ |
| | $R_2=-13.780$ | $s_1=.100$ to $.900$ | | |
| $L_2$ | $R_3=-11.761$ | $t_2=.140$ | $n_d=1.523$ | $V=58.6$ |
| | $R_4=+5.364$ | $s_2=.146$ | | |
| $L_3$ | $R_5=-5.364$ | $t_3=.140$ | $n_d=1.523$ | $V=58.6$ |
| | $R_6=+11.761$ | $s_3=.900$ to $.100$ | | |
| $L_4$ | $R_7=+13.780$ | $t_4=.210$ | $n_d=1.523$ | $V=58.6$ |
| | $R_8=-5.708$ | | | |

References Cited in the file of this patent

UNITED STATES PATENTS

| | | |
|---|---|---|
| 2,078,586 | Richter | Apr. 27, 1937 |
| 2,179,850 | Glancy | Nov. 14, 1939 |
| 2,353,565 | Kaprelian | July 11, 1944 |
| 2,578,574 | Miles | Dec. 11, 1951 |
| 2,649,025 | Cook | Aug. 18, 1953 |
| 2,663,223 | Hopkins | Dec. 22, 1953 |
| 2,685,229 | Schulz et al. | Aug. 3, 1954 |
| 2,859,654 | Back | Nov. 11, 1958 |

FOREIGN PATENTS

| | | |
|---|---|---|
| 597,354 | Germany | May 25, 1934 |
| 1,150,483 | France | Aug. 12, 1957 |